(12) United States Patent
Song

(10) Patent No.: US 6,289,018 B1
(45) Date of Patent: Sep. 11, 2001

(54) ATM SWITCHING SYSTEM SUPPORTING N-ISDN TRAFFIC AND METHOD FOR CONTROLLING THE SAME

(75) Inventor: Doug-Young Song, Songnam (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/095,726

(22) Filed: Jun. 11, 1998

(30) Foreign Application Priority Data

Jun. 11, 1997 (KR) .................................................. 97-24034

(51) Int. Cl.[7] .............................. H04L 12/28; H04L 12/56
(52) U.S. Cl. .......................................... 370/395; 370/359
(58) Field of Search ................................... 370/395, 351, 370/352, 353, 354, 359, 360, 366, 369, 372, 375, 376, 388, 389, 392, 396, 397, 398, 400, 437, 442, 458, 465, 466, 474, 476

(56) References Cited

U.S. PATENT DOCUMENTS

| | | | |
|---|---|---|---|
| 4,977,556 | * 12/1990 | Noguchi | 370/400 |
| 5,214,642 | 5/1993 | Kunimoto et al. | 370/471 |
| 5,220,562 | 6/1993 | Takada et al. | 370/404 |
| 5,220,563 | 6/1993 | Grenot et al. | 370/396 |
| 5,280,476 | 1/1994 | Kojima et al. | 370/397 |
| 5,375,118 | 12/1994 | Rao et al. | 370/401 |
| 5,390,175 | 2/1995 | Hiller et al. | 370/398 |
| 5,436,899 | 7/1995 | Fujino et al. | 370/433 |
| 5,446,731 | * 8/1995 | Lee | 370/377 |
| 5,457,684 | 10/1995 | Bharucha et al. | 370/433 |
| 5,483,527 | 1/1996 | Doshi et al. | 370/399 |
| 5,537,403 | * 7/1996 | Cloonan et al. | 370/352 |
| 5,541,926 | 7/1996 | Saito et al. | 370/474 |
| 5,608,447 | 3/1997 | Farry et al. | 725/116 |
| 5,610,921 | 3/1997 | Christensen | 370/395 |
| 5,623,491 | 4/1997 | Skoog | 370/397 |
| 5,638,364 | 6/1997 | Sugita | 370/397 |
| 5,680,396 | * 10/1997 | Moritomo et al. | 370/392 |
| 5,737,312 | 4/1998 | Sasagawa | 370/232 |
| 5,742,765 | 4/1998 | Wong et al. | 370/230 |
| 5,805,592 | * 9/1998 | Hatano | 370/395 |
| 5,943,337 | * 8/1999 | Sasagawa | 370/395 |
| 6,118,796 | * 9/2000 | Best et al. | 370/524 |

* cited by examiner

Primary Examiner—Dang Ton
Assistant Examiner—Phirin Sam
(74) Attorney, Agent, or Firm—Robert E. Bushnell, Esq.

(57) ABSTRACT

An ATM switching system has a subscriber input module, a trunk input module, an ATM switch, a subscriber output module, and a trunk output module. The subscriber input module includes: a 2B+D frame handler for splitting 2B+D channel data output from an N-ISDN subscriber into B-channel data and D-channel data, and multiplexing the split B- and D-channel data to corresponding highways; a first time switch module for sorting the channel data on the respective highways by time slots corresponding to destination time switch module numbers, and switching channel stream data grouped by destinations to the respective highways; and a first input CLAD for collecting voice data output from the time switch module by destinations to assemble an ATM cell. The trunk input module includes: a frame handler for splitting frame data output from an N-ISDN trunk into B-channel data and D-channel data, and multiplexing the split B- and D-channel data to respective highways; a second time switch module for sorting the channel data on the respective highways by time slots corresponding to destination time switch module numbers, and switching channel stream data grouped by destinations to the respective highways; and a second input CLAD for collecting voice data output from the second time switch module by destinations to assemble an ATM cell. The ATM switch has input ports connected to the subscriber input module and the trunk input module and has output ports connected to the subscriber output module and the trunk output module, and self-routes the ATM cell input from the subscriber input module and the trunk input module to switch the ATM cell to a corresponding destination.

10 Claims, 14 Drawing Sheets

ATM SWITCHING SYSTEM SUPPORTING N-ISDN TRAFFIC AND METHOD FOR CONTROLLING THE SAME

CLAIM OF PRIORITY

This application makes reference to, incorporates the same herein, and claims all benefits accruing under 35 U.S.C. §119 from an application for ATM SWITCHING SYSTEM SUPPORTING N-ISDN TRAFFIC AND METHOD FOR CONTROLLING THE SAME earlier filed in the Korean Industrial Property Office on the Jun. 11, 1997 and there duly assigned Serial No. 24034/1997.

BACKGROUND OF THE INVENTION

1. Field of the Invention

The present invention relates to an ATM switching system, and in particular, to an ATM switching system capable of servicing N-ISDN traffic and a method for controlling the same.

2. Description of the Related Art

Since an ATM (Asynchronous Transfer Mode) technology was adopted as a principal technology for realizing B-ISDN (Broadband-Integrated Services Digital Network), various communication equipment employing the ATM technology have been put on the market. According to the state of the art, the ATM technology can service N-ISDN (Narrowband-ISDN) traffic through an ATM network. Though many efforts have been made to service the N-ISDN traffic using the ATM technique, it is not yet possible to provide the voice subscriber with a satisfactory service, since the ATM technique is different from the existing circuit switching (or line switching) technique in the data transfer mode. Therefore, in a transition period, the ATM switching system requires an additional function for servicing the N-ISDN traffic.

At present, many efforts have been made to provide voice service to the subscriber connected to a public switched telephone network (hereinafter referred to as a PSTN) by means of an interworking device disposed between the PSTN and the ATM network. However, in this case, a time delay problem and a lowered cell transfer efficiency problem (i.e., a lowered bandwidth efficiency problem) are caused, when N-ISDN traffic data output from the PSTN is assembled into an ATM cell.

The following patents each disclose features in common with the present invention but do not teach or suggest the specifically recited ATM switching system for supporting N-ISDN traffic and a method for controlling the same in accordance with the present invention: U.S. Pat. No. 5,375,118 to Rao et al., entitled Apparatus For Transmitting Data Between Two Parties Belonging To At Least One Narrow Band Integrated Services Digital Network, U.S. Pat. No. 5,623,491 to Skoog, entitled Device For Adapting narrow-band Voice Traffic Of A Local Access Network To Allow Transmission Over A Broadband Asynchronous Transfer Mode Network, U.S. Pat. No. 5,608,447 to Farry et al, entitled Full Service Network, U.S. Pat. No. 5,638,364 to Sugita, entitled ATM-LAN With CLSF Processor And Simplified CLAD Units, U.S. Pat. No. 5,742,765 to Wong et al., entitled Combination Local ATM Segmentation And Reassembly And Physical Layer Device, U.S. Pat. No. 5,737,312 to Sasagawa, entitled Cell Assembly And Disassembly Apparatus In AN ATM Network, U.S. Pat. No. 5,610,921 to Christensen, entitled Scalable Architecture For Asynchronous Transfer Mode Segmentation And Reassembly, U.S. Pat. No. 5,541,926 to Saito et al, entitled A TM Cell Assembly And Disassembly Device With Enhanced Data Handling Flexibility, U.S. Pat. No. 5,390,175 to Hiller et al, entitled Inter-Cell Switching Unit For Narrow Band ATM Networks, U.S. Pat. No. 5,214,642 to Kunimoto et al., entitled ATM Switching System And Adaptation Processing Apparatus, U.S. Pat. No. 5,220,562 to Takada et al., entitled Bridge Apparatus And A Communication System Between Networks Using The Bridge Apparatus, U.S. Pat. No. 5,220,563 to Grenot et al., entitled Device For The Transmission By An Asynchronous Network, Notably An ATM Type Network, Of Signaling Data, Channel By Channel, Assembled In A Multiframe Transmitted Synchronously In Out-Of Band Mode, U.S. Pat. No. 5,280,476 to Kojima et al., entitled Communication Control System Using An Asynchronous Transfer Mode Network, U.S. Pat. No. 5,457,684 to Bharucha et al., entitled Delay-Less Signal Processing Arrangement For Use In An ATM Network, U.S. Pat. No. 5,483,527 to Doshi et al., entitled Terminal Adapter For Interfacing An A TM Network With A STM Network, and U.S. Pat. No. 5,436,899 to Fujino et al., entitled High Performance Digitally Multiplexed Transmission System.

SUMMARY OF THE INVENTION

It is therefore an object of the present invention to provide an ATM switching system capable of handling both the STM traffic and the ATM traffic using a single switch.

It is another object of the present invention to provide an ATM switching system capable of handing both the STM traffic and the ATM traffic, in which interworking devices between the STM traffic and the ATM traffic are distributed to respective ports of an ATM switch so as to get rid of the bottleneck phenomenon.

It is still another object of the present invention to provide an ATM switching system capable of performing a routing operation using a single ATM switch.

It is further still another object of the present invention to provide an ATM switching system which is free from a time delay in transferring a cell, by assembling different voice data into the cell by a frame period.

It is yet another object of the present invention to provide an ATM switching system for multiplexing a plurality of calls to assemble them into the cells, so as to improve a cell bandwidth efficiency.

To achieve the above objects, there is provided an ATM switching system including a subscriber input module, a trunk input module, an ATM switch, a subscriber output module, and a trunk output module. The subscriber input module includes a 2B+D frame handler for splitting 2B+D channel data output from an N-ISDN subscriber into B-channel data and D-channel data, and multiplexing the split B- and D-channel data to corresponding highways; a first time switch module for sorting the channel data on the respective highways by time slots corresponding to destination time switch module numbers, and switching channel stream data grouped by destinations to the respective highways; and a first input CLAD for collecting voice data output from the time switch module by destinations to assemble an ATM cell. The trunk input module includes a frame handler for splitting frame data output from an N-ISDN trunk into B-channel data and D-channel data, and multiplexing the split B- and D-channel data to respective highways; a second time switch module for sorting the channel data on the respective highways by time slots corresponding to destination time switch module numbers, and switching channel stream data grouped by destinations to the respective highways; and a second input CLAD for collecting voice data output from the second time switch module by destinations to assemble an ATM cell. The ATM switch having input ports connected to the subscriber input module and the trunk input module and output ports connected to the subscriber output module and the trunk output module, self-routes the ATM cell input from the subscriber input module and the trunk input module to switch the ATM cell to a corresponding destination. The subscriber output module, having a same construction as that of the subscriber input module, handles, in reverse order, the ATM cell output from the ATM switch and outputs the handled ATM cell to another N-ISDN subscriber. The trunk output module, having a same construction as that of the trunk input module, handles, in reverse order, the ATM cell output from the ATM switch and outputs the handled ATM cell to another N-ISDN trunk.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
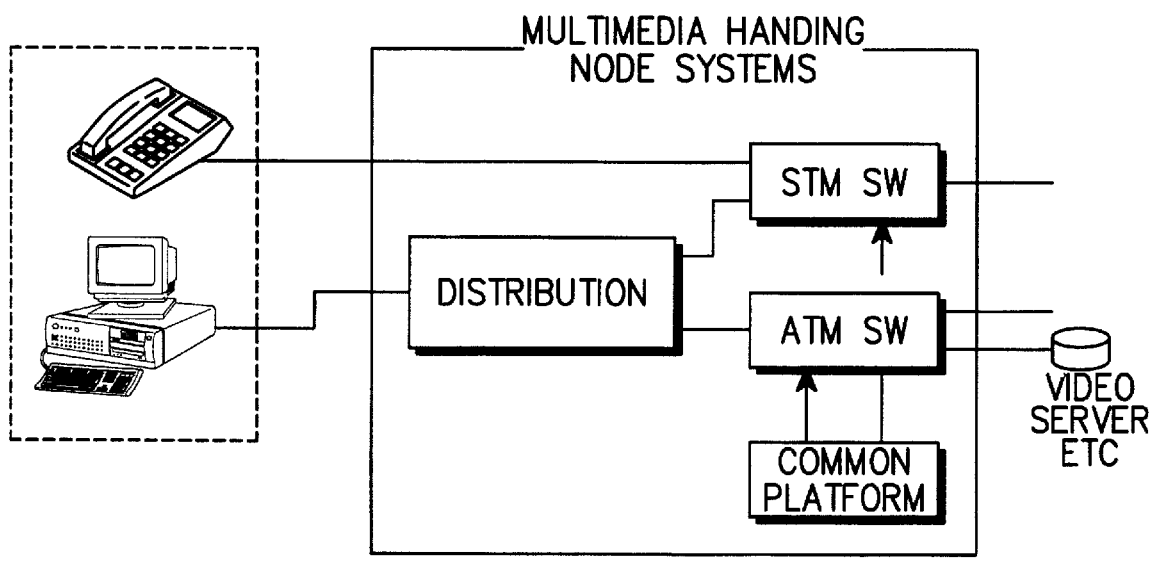
FIG. 1 illustrates a multimedia handling node (MHN) system adopting both STM and ATM techniques according to the prior art.

FIG. 1 illustrates the structure of a multimedia handling node (hereinafter referred to as MHN) proposed by Ohnishi et al., NTT (Nippon Telephone & Telegraph), Japan. (See H. Ohnishi, S. Suzuki, H. Nakayama, H. Tanaka, T. Takahashi, and H. Ishikawa, "*All Band Switching Node Architecture for Flexible and Cost-Effective Evolution toward B-ISDN*" ISS '95 B1.2)

The MHN system, which is compatible with both the existing circuit switch and the ATM switch, includes an STM (Synchronous Transfer Mode) switch and an ATM switch, being operable independently of each other. An early B-ISDN service is for business purposes. However, it is uneconomical to replace the existing high-priced STM switch with the new ATM switch. Therefore, the MHN system can be one of the alternative plans to replace the STM switch with the ATM switch flexibly and cost-effectively. The MHN system is compatible with both the STM switch and the ATM switch, using the same hardware and software platform, and can accommodate any of an STM node, an ATM node, and a mixed STM/ATM node.

Figure 2:
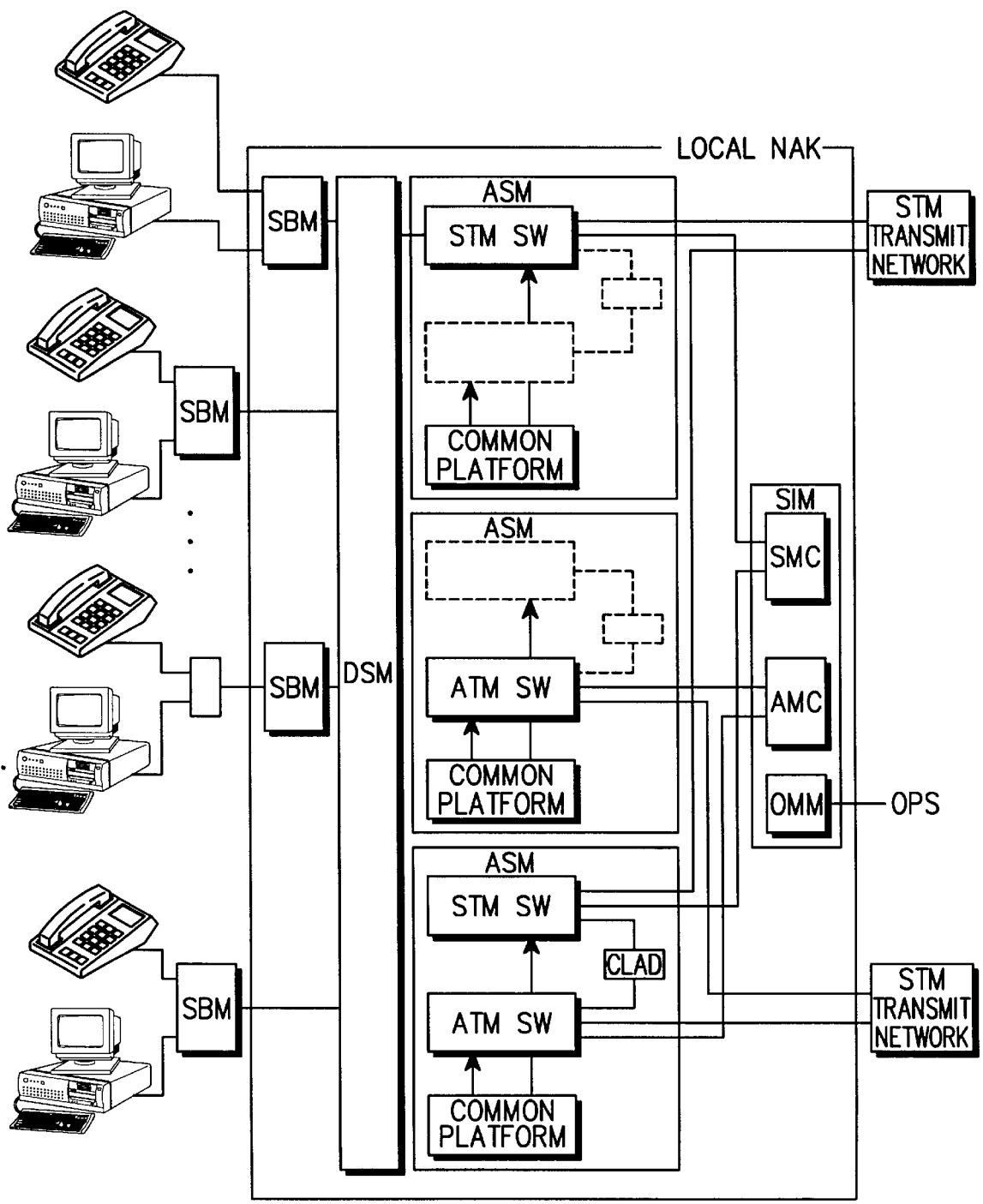
FIG. 2 illustrates a switching system based on the construction of FIG. 1.

Further, the MHN system employs the structure in which an STM module interworks with an ATM module by way of a CLAD (Cell Assembly and Disassembly), as illustrated in FIG. 2. Referring to FIG. 2, reference letter ASM denotes an abbreviation of an ATM/STM handling module, reference letter SBM a subscriber module, reference letter SIM a system interface module, and reference letter DSM a distribution module.

However, the MHN system described above has the following shortcomings.

(1) The MHN system includes both the STM switch and the ATM switch, which run parallel with each other independently, so that the system may be complicated and expensive.

(2) The MHN system requires the CLAD which is a centralized interworking device between the STM switch and the ATM switch. Therefore, the entire traffic of the STM switch and the ATM switch is interworked by means of the single centralized CLAD, which makes it difficult to control the traffic. Further, in case there is a great amount of the traffic between the STM switch and the ATM switch, a bottleneck phenomenon may occur in the CLAD.

(3) The MHN system should perform a routing operation twice, to switch a cell; that is, first routing from the STM and ATM switches of the originating party to the CLAD, and second routing from the CLAD to the ATM and STM switches at the destination (i.e., the terminating party).

(4) The MHN system causes a cell delay during switching the cell. The cell delay problem caused in the process of assembling the voice data into the cell affects the voice service in quality. In a voice communication, if the voice data is transferred at an integral of 125 $\mu$sec, i.e., B-channel data (with a transfer rate of 64 Kbps) are transferred after being fully filled in the ATM cell, the MHN system causes a time delay of about 6 msec (to be exact, 5.875 msec), which hinders the voice service in quality. Further, since the time delay in the voice service generates echoes inevitably, the system requires an echo canceller.

(5) The MHN system has a lowered cell bandwidth efficiency. In case the MIN system fills the B-channel data or D-channel data in the cell to be transmitted in order to solve the time delay problem in assembling the cell, the cell bandwidth efficiency is lowered undesirably.

Figure 3:
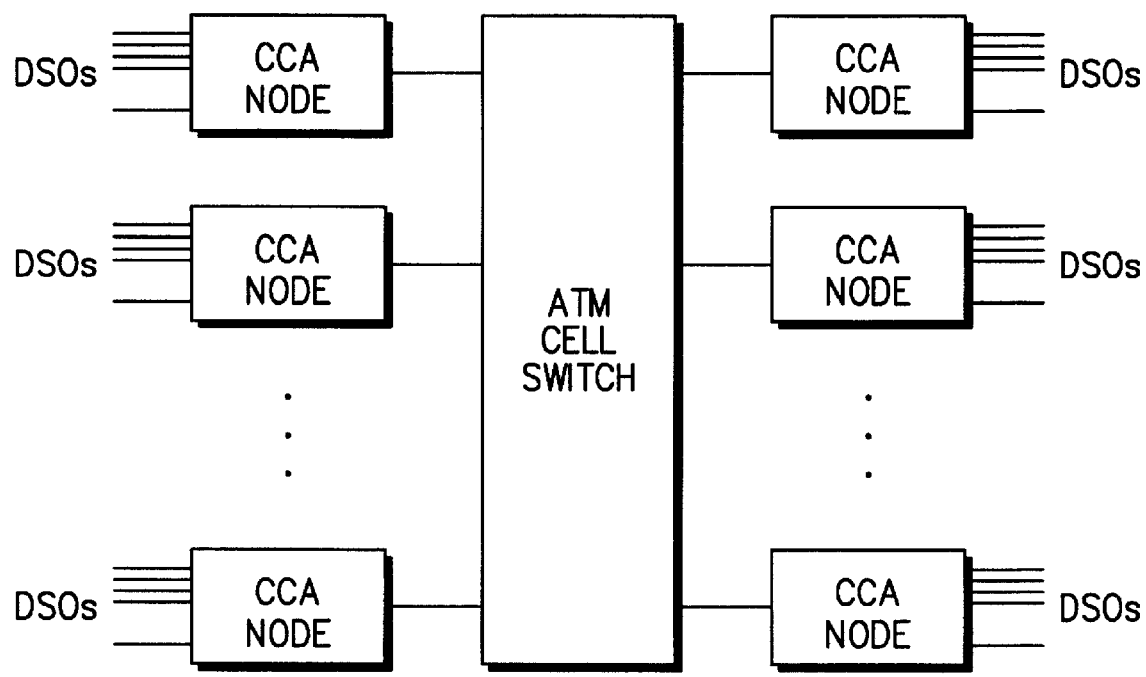
FIG. 3 illustrates a time-cell-time (TST) switch supporting a DS0 (Digital Signal level 0) service according to the prior art.

A TCT (Time Cell Time) switch proposed by Spanke et al., AT&T is shown in FIG. 3. (See R. Spandke and J. Adrian, "*ATM Composite Cell Switching for DS0 Digital Switches*", ISS '95 Pb3)

In FIG. 3, a CCA node stands for a composite cell assembly node, and DS0 stands for digital signal level 0 (64

Kbps). FIG. 3 illustrates a conceptual TCT switch supporting the voice service provided from the PSTN by using the ATM switch. However, a method for realizing the conceptual TCT switch has not been proposed yet.

In general, an ATM switching system is standardized such that it can provide a multimedia service including voice, data, and video. However, since the ATM switching technique is conceptually different from the existing circuit switching technique, the ATM switching system cannot use the switching methods supported by the existing PSTN or N-ISDN systems. Thus, the ATM switch requires an interworking device for connecting an N-ISDN with the PSTN.

Accordingly, the ATM switching system requires an interworking device for handling N-ISDN traffic, and further requires a switching structure capable of minimizing the time delay problem and the lowered cell transfer efficiency problem caused when assembling the voice data into an ATM cell. Of course, the ATM switching system requires various software programs including an existing call handling function for handling the voice traffic as well as the ATM traffic.

The ATM switching system according to the present invention is very useful in that it can handle several media in an intermediate phase between an N-ISDN phase and a B-ISDN phase. The ATM switching system rearranges a B-channel and a D-channel such that a received N-ISDN frame (2B+D, 23B+D/30B+D) conforms to an input condition of a time switch used in the PSTN. In this way, the time switch groups the channels by destinations to assemble the ATM cell. The assembled ATM cells are transferred to the time switch modules at the corresponding destinations via the ATM switch. Then, the destination (or terminating party) performs the reverse operation, thereby completing the switching function.

In this application, the description will be made, laying stress on the operation of servicing the N-ISDN voice traffic.

Figure 4:
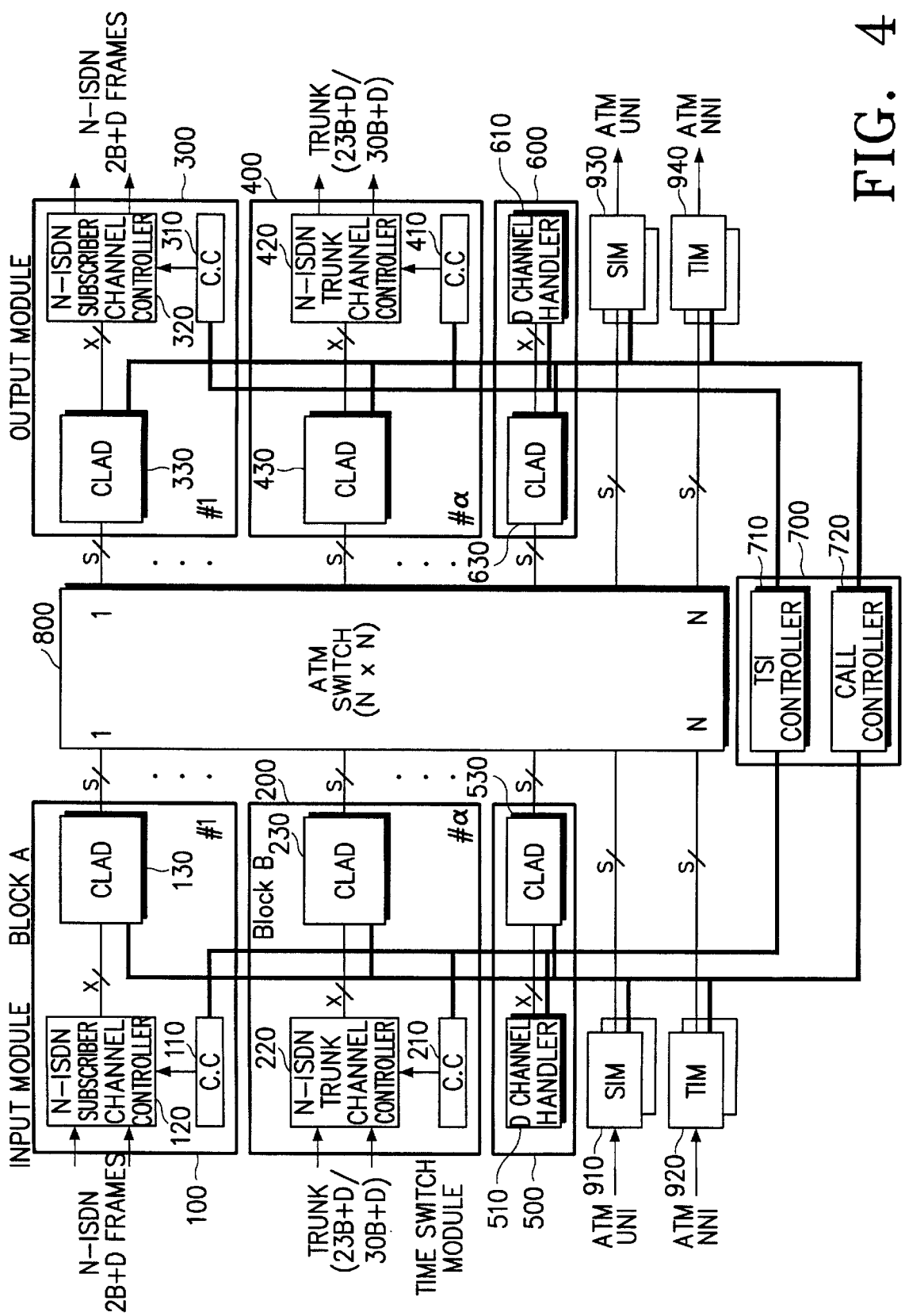
FIG. 4 illustrates the structure of an ATM switch for servicing N-ISDN traffic according to an embodiment of the present invention.

FIG. 4 illustrates an ATM switching system according to an embodiment of the present invention. Referring to FIG. 4, an N-ISDN subscriber input module (or originating module) 100 includes a channel control memory (CC) 110, an N-ISDN subscriber channel controller 120, and a CLAD 130. The N-ISDN subscriber channel controller 120, composed of a 2B+D frame handler and a time switch module, handles 2B+D frame data input from the N-ISDN subscriber, and then switches it by a time slot interchange (TSI) technique. The channel control memory 110 stores control information for splitting and switching the channels of the N-ISDN subscriber channel controller 120 under the control of a channel controller (or a TSI controller) 710. The CLAD 130 assembles N-ISDN DS0 stream data output from the N-ISDN subscriber channel controller 120 into an ATM cell.

An N-ISDN trunk input module 200 includes a channel control memory (CC) 210, an N-ISDN trunk channel controller 220, and a CLAD 230. The N-ISDN trunk channel controller 220, composed of a T1 or E1 frame handler and a time switch module, handles frame data input from the N-ISDN trunk and then switches it by the time slot interchange technique. The channel control memory 210 stores control information for splitting and switching the channels of the N-ISDN trunk channel controller 220. The CLAD 230 assembles N-ISDN DS0 stream data output from the N-ISDN trunk channel controller 220 into an ATM cell.

A D-channel input module 500 includes a D-channel handler 510 and a CLAD 530. The D-channel handler 510 handles the D-channel split by the input modules 100 and 200, and the CLAD 530 assembles D-channel stream data output from the D-channel handler 510 into the ATM cell.

A SIM (Subscriber Interface Module) 910 interfaces an ATM cell output from an ATM UNI (User Network Interface), and a TIM (Trunk Interface Module) 920 interfaces an ATM cell output from an ATM NNI (Network Node Interface). The SIM 910 and the TIM 920 are connected in common to an ATM switch 800, without a CLAD.

An N-ISDN subscriber channel output module (or destination module) 300, connected to the ATM switch 800, has a reverse construction with respect to the N-ISDN subscriber input module 100, and thus performs the reverse operation. Similarly, an N-ISDN trunk output module 400, connected to the ATM switch 800, has a reverse construction with respect to the N-ISDN trunk input module 200 and thus performs the reverse operation. Further, a D-channel output module 600, connected to the ATM switch 800, has a reverse construction with respect to the D-channel input module 500 and thus performs the reverse operation. A SIM 930 and a TIM 940, connected to the ATM switch 800, also perform the reverse operation of the SIM 910 and the TIM 920.

The channel controller (or ISDN/TSI/D-channel Controller) 710 assembles the channel stream data into an ATM cell and disassembles an ATM cell into the channel stream data, by controlling the subscriber input module 100, the trunk input module 200, the D-channel input module 500, the subscriber output module 300, the trunk output module 400, and the D-channel output module 600. A call controller 720 enables the SIMs 910 and 930, the TIMs 920 and 940 and, CLADs 130, 230, 330, 430, 530, and 630 to input and output an ATM cell to and from the ATM switch 800.

As illustrated in FIG. 4, the ATM switching system according to the present invention includes the N-ISDN channel control modules 100, 200, 300, and 400 (each consisting of a 2B+D interface and a time switch module), the CLADs 130, 230, 530, 330, 430, and 630, the ATM switch 800, and a controller 700 (consisting of the channel controller 710 and the call controller 720). The ATM interface (consisting of the SIMs 910 and 930, and the TIMs 920 and 940) may be directly connected to the ATM switch 800, without a CLAD.

Each of the N-ISDN channel control modules 100, 200, 300, and 400 includes a frame handler for handling a subscriber interface (basic rate: 2B+D) or a trunk interface (primary rate: 23B+D or 30B+D), and a time switch module. The basic rate subscriber interface has a 2B+D frame handler, and the primary rate trunk interface has a 23B+D or 30B+D frame handler. The time switch module consisting of a speech memory, a control memory, and a control logic, performs a time slot interchange (TSI) function in the same way as the circuit switching system. The CLADs 130, 230, and 530 of in the respective input modules 100, 200, and 500 assemble the channel stream data into the ATM cell. The function of attachment of cell headers and routing tags to a payload portion of the ATM cell, indication of effective data length, and header information are received from the call controller 720 at the time of call setting, to thereby be stored in the CLAD internal routing table until the call is released. On the contrary, the CLADs 330, 430, and 630 in the respective output modules 300, 400, and 600 perform the reverse operation of the CLADs 130, 230, and 530.

The ATM switch 800 for switching the ATM cell may be realized by a general ATM switch. The controller 700 consists of the channel controller 710 for controlling an N-ISDN call and the call controller 720 for controlling the ATM call.

Referring to FIG. 4, the ATM switching system includes the N-ISDN subscriber channel controllers 120 and 320 and the N-ISDN trunk channel controllers 220 and 420, each being composed of the time switch module and the basic/primary frame handler; the CLADS 130, 230, 330, and 430, connected between the ATM switch 800 and the N-ISDN channel controllers 120, 220, 320, and 420, for assembling and disassembling the ATM cells; the ATM switch 800 for switching the ATM cells; the SIMs 910 and 930 for connecting the ATM subscriber; TIMs 920 and 940 for connecting the ATM trunk; the call controller (or TSI controller) 700 for controlling the N-ISDN call or the ATM call; D-channel handlers 510 and 610 like the packet handler; and other control logic.

The stream data input from the N-ISDN subscriber or N-ISDN trunk is time switched by the N-ISDN subscriber channel controller 120 or the N-ISDN trunk channel controller 220, assembled into ATM cell by the CLAD 130 or 230, and then switched by the ATM switch 800. To output the ATM cell switched in the ATM switch 800 to the N-ISDN subscriber or the trunk, the CLAD 330 or the 430 disassembles the switched ATM cell and then the N-ISDN subscriber channel controller 320 or the N-ISDN trunk channel controller 420 time-switches the disassembled ATM cell and transfers it to the destination.

Figure 5:
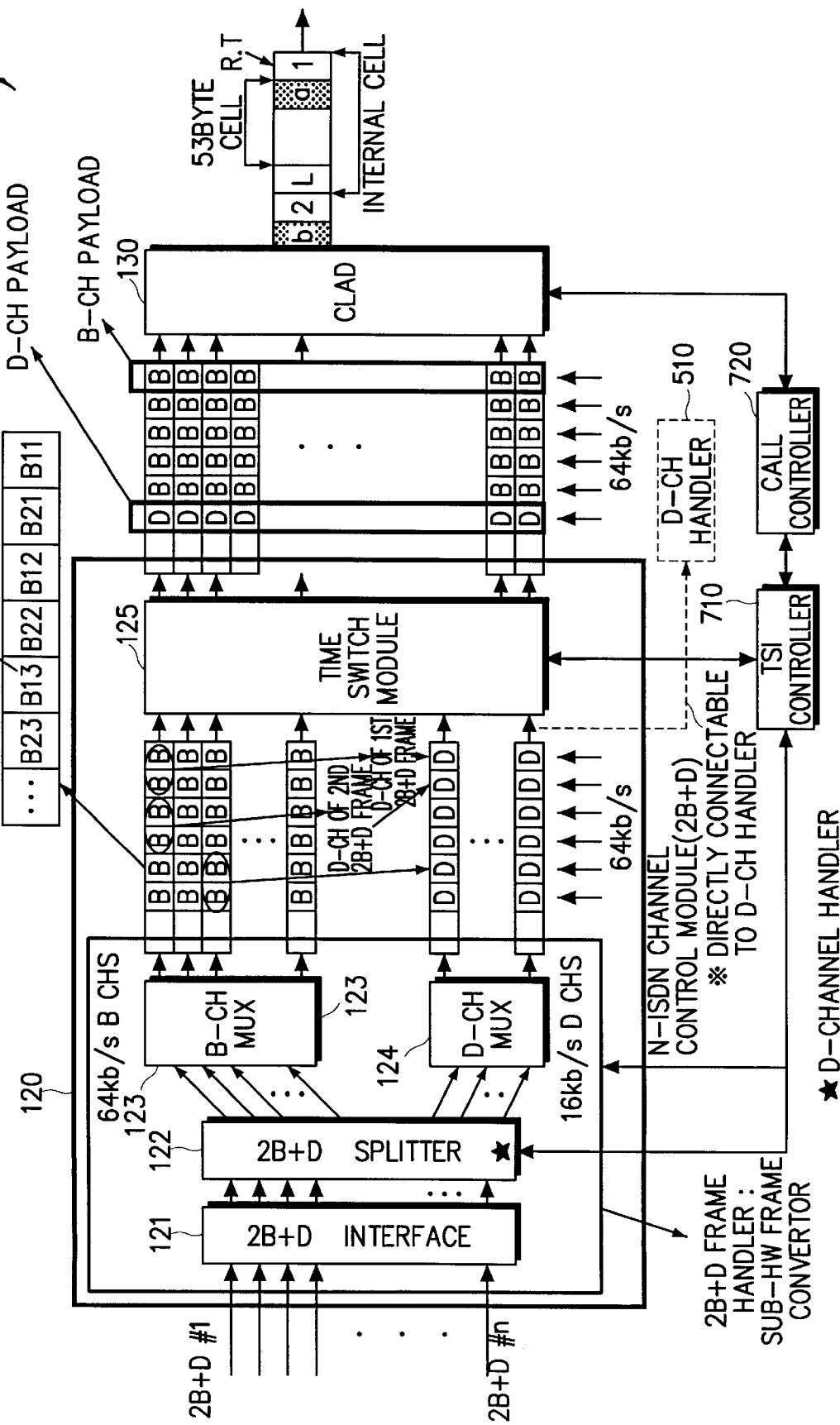
FIG. 5 illustrates the connection between an N-ISDN subscriber channel controller (120) and a CLAD (130) of FIG. 4.
Figure 6:
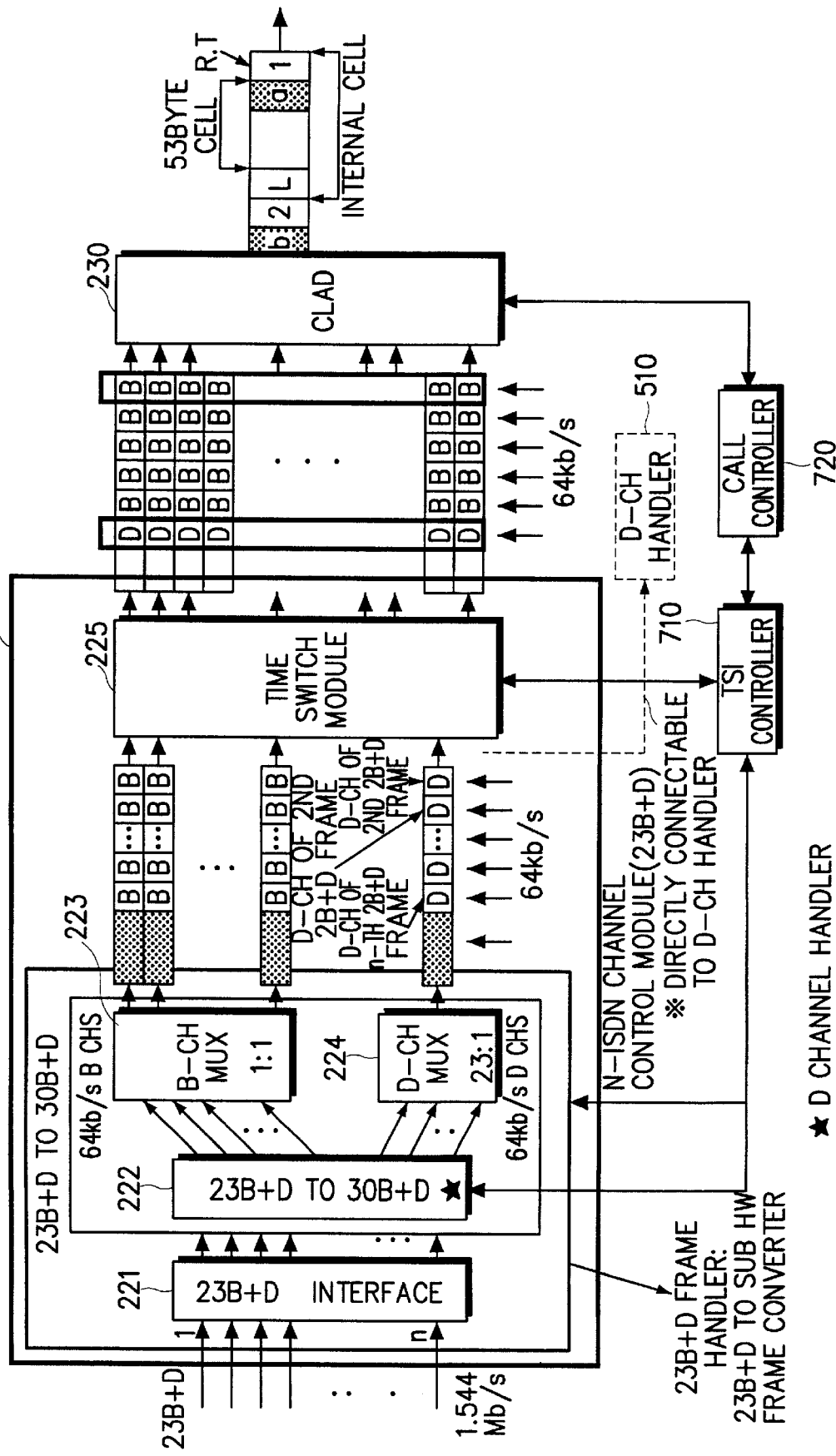
FIG. 6 illustrates the connection between an N-ISDN T1 trunk channel controller (220) and a CLAD (230) of FIG. 4.
Figure 7:
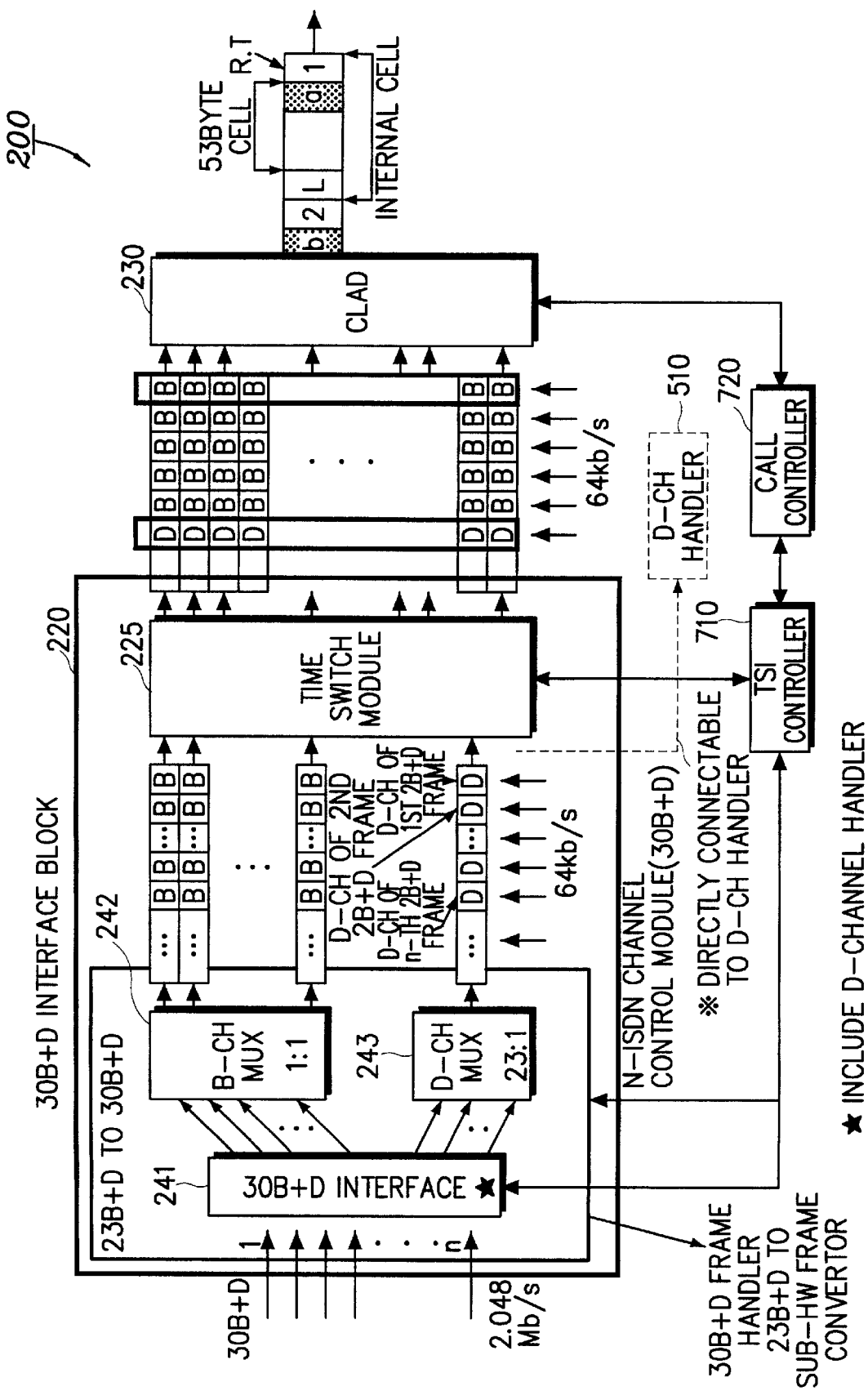
FIG. 7 illustrates the connection between an N-ISDN E1 trunk channel controller (220) and the CLAD (230) of FIG. 4.

As illustrated, the N-ISDN channel controllers 120, 220, 320, and 420 are divided into the N-ISDN subscriber channel controllers 120 and 320, and the N-ISDN trunk channel controllers 220 and 420. With reference to FIG. 5, each of the N-ISDN subscriber channel controllers 120 and 320 includes a 2B+D frame handler and a time switch module 125. The 2B+D frame handler is composed of a 2B+D interface 121, a 2B+D splitter 122, a B-channel multiplexer 123, and a D-channel multiplexer 124. Further, the N-ISDN trunk channel controllers 220 and 420 have different construction according to the trunk types. That is, the trunk is divided into a North American T1 type and an European E1 type. FIG. 6 shows the N-ISDN T1 trunk channel controller, and FIG. 7 shows the N-ISDN E1 trunk channel controller. In this application, the description will be given, laying stress on the subscriber input module 100 and the trunk input module 200.

First, describing the construction and operation of the N-ISDN subscriber channel controller 120, the 2B+D channel data output from the subscriber is processed by the 2B+D interface 121, and to split into B-channel data and D-channel data by the 2B+D splitter 122. Here, the 2B+D splitter 122 discriminates whether the D-channel data is LAPD (Link Access Protocol-D channel) data or user information such as the packet data. If the D-channel data is the LAPD data, the 2B+D splitter 122 transfers the D-channel data to the channel controller 710. However, if the D-channel data is the user information, the 2B+D splitter 122 processes it in the same manner as the B-channel data. Once the B-channel is split from the D-channel, the B-channel multiplexer 123 multiplexes the split B-channel data to the same sub-highway by 16:1 multiplexing, and the D-channel multiplexer 124 multiplexes the split D-channel data to the same sub-highway by 32:1 multiplexing. To multiplex the D-channel data, the D-channel multiplexer 124 inserts D-channel data of a first 2B+D frame into a first time slot of the D-channel sub-highway, D-channel data of a second 2B+D frame into a second time slot, . . . , and D-channel data of n-th 2B+D frame into n-th time slot. Here, it is noted that the D-channel data are separately grouped and multiplexed in order to connect the D-channel sub-highway to the D-channel handler directly without routing a switch fabric, though they can be multiplexed to the B-channel sub-highway. Further, the D-channel sub-highway can be transferred to the D-channel handler 510 via the time switch module 125, the CLAD 130, and the ATM switch 800. The above two cases are both available in the ATM switching system of the present invention.

In this construction, the 2B+D interface 121, the 2B+D splitter 122, the B-channel multiplexer 123, and the D-channel multiplexer 124 constitutes the 2B+D frame handler. The sub-highways arranged by the 2B+D frame handler are time-slot-interchanged by the time switch module 125. The time switch module 125 operates in the same way as the exiting circuit switching system. The data output from the time switch module 125 are assembled into the ATM cell by the CLAD 130, applied to an input port of the ATM switch 800, switched by the ATM switch 800, and transferred to the CLADs 330 and 430 at the destination or to the ATM interfaces 930 and 940. The ATM cells applied to CLADs 330 and 430 are processed in the reverse operation, and transferred to the subscriber or the trunk at the destination side.

Next, the construction and operation of the N-ISDN trunk channel controller 220 will be described. With reference to FIG. 6, the N-ISDN T1 trunk channel controller 220 includes a 23B+D frame handler and a time switch module 225. The 23B+D frame handler consists of a 23B+D interface 221 for receiving 23B+D T1 frame data at a data transfer rate of 1.54 Mbps, an interface 222 for converting the 23D+B frame data to 30B+D frame data, a B-channel multiplexer 223 for multiplexing the B-channel data of the frame data output from the interface 222, and a D-channel multiplexer 224 for multiplexing the D-channel data out of the frame data output from the interface 222.

With reference to FIG. 7, the N-ISDN E1 trunk channel controller 220 includes a 30B+D frame handler and the time switch module 225. The 30B+D frame handler consists of a 30B+D interface 241 for receiving 30B+D E1 frame data at a data transfer rate of 2.048 Mbps, a B-channel multiplexer 242 for multiplexing the B-channel data of the 30B+D frame data output from the interface 241, and a D-channel multiplexer 243 for multiplexing the D-channel data out of the frame data output from the interface 241.

The N-ISDN trunk channel controller 220 and the time switch module 225 operate in the same way as the N-ISDN subscriber channel controller 120. Thus, the description will now be made on the operation of the trunk interface.

Describing the operation of the T1 trunk channel controller 220 for processing the 23B+D T1 frame data, the 23B+D interface 221 interfaces with the received 23B+D T1 frame, discriminates the B-channel from the D-channel, and multiplexes the B- and D-channels to the corresponding sub-highways, like the N-ISDN subscriber channel controller 120. The D-channel data is multiplexed to the sub-highway frame in such a manner that the D-channel data of a first 23B+D frame is multiplexed to a first channel of the sub-highway frame, the D-channel data of a second 23B+D frame is multiplexed to a second channel of the sub-highway frame, and the D-channel data of n-th 23B+D frame is multiplexed to an n-th channel of the sub-highway frame. The time switch module 225 operations in the same way as the time switch module 125 in the N-ISDN subscriber channel controller 120.

Next, describing operation of the E1 trunk channel controller 220 for handling the 30B+D E1 frame, the 30B+D interface 241 interfaces with the received 30B+D T1 frame, discriminates the B-channel from the D-channel, and multiplexes the B- and D-channels to the corresponding sub-highways, like the N-ISDN subscriber channel controller 120. The 303B+D interface 241 operates similar to the 23B+D trunk interface 221, except that 30B+D E1 frame handler multiplexes the B- or D-channel data to the output sub-highway, without leaving empty time slots. That is, the 30B+D frame handler has a time slot number of input frames which is the same as a time slot number of output frames, so that there are no empty slots generated.

Figure 8:
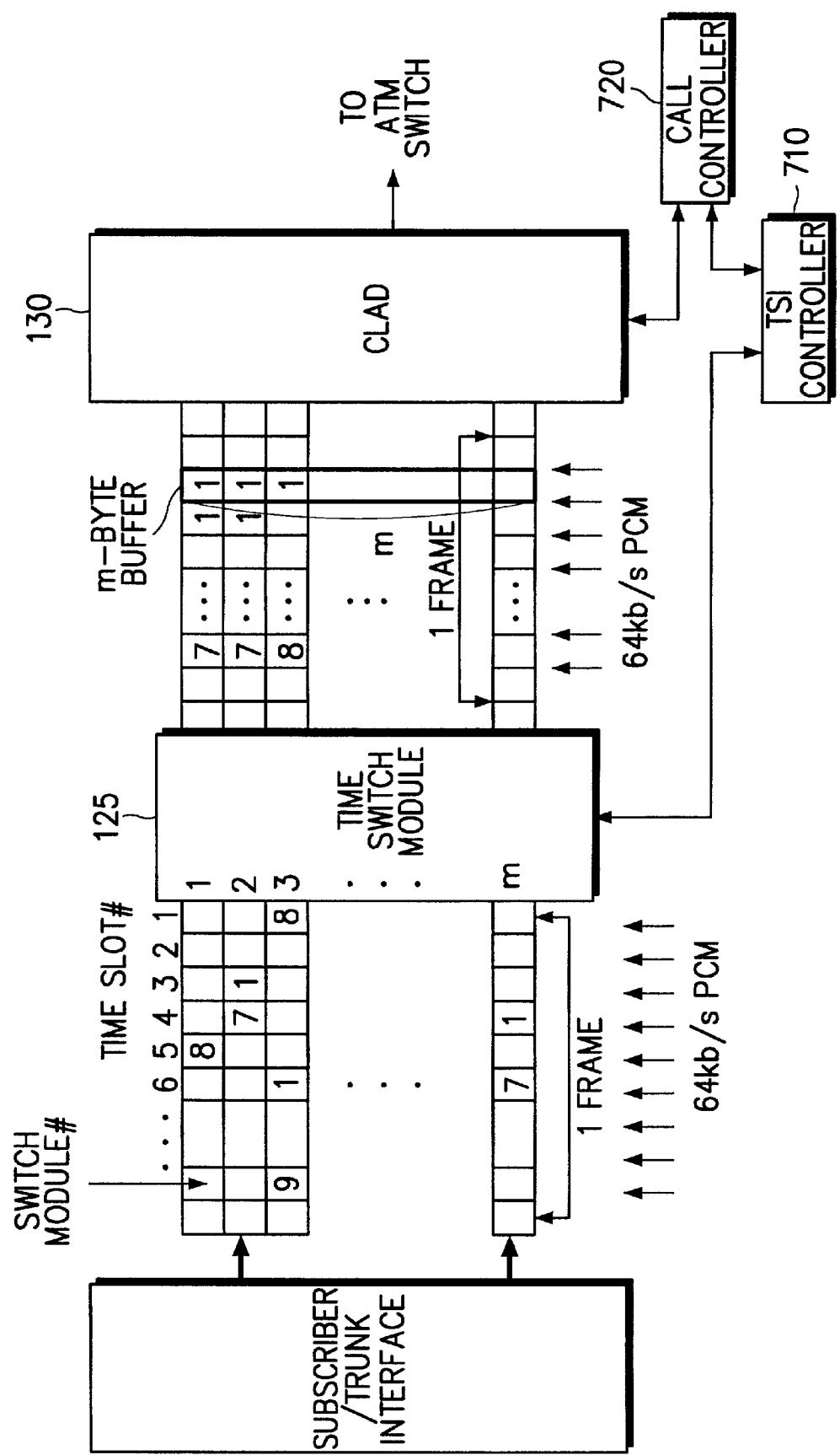
FIG. 8 illustrates the structure of a time switch module of FIG. 4.

As described above, the N-ISDN channel controllers 120, 220, 320, and 420 include the time switch modules 125, 225, 325, and 425, respectively, each having the same construction. FIG. 8 shows connection between the time switch module 125 of the subscriber input module 100 and its associated circuits, for the convenience of explanation.

The time switch module 125 is identical to that used for the existing circuit switching system, and thus has the same call control method. That is, the time switch module 125 switches the respective DS0 channels of the sub-highway stream whose data is multiplexed at 64 Kbps, by the time slot interchange method. Here, the control information for the time slot interchange is stored in an internal control memory of the time switch module 125. In accordance with the present invention, the time slot interchange function of the time switch module 125 is performed as described below.

First, the time switch module 125 switches the time slots in such a manner that the time slots are sorted in ascending order on the basis of a time slot corresponding to a destination (output) time switch module number for the DS0 channels of the input sub-highway. That is, the data being bound for the smaller destination time switch module number are arranged at the places where the sub-highway has the smaller time slot number. FIG. 8 shows the destination time switch modules 1, 7, and 8, by way of example. The sorting is performed by the control memory in the time switch module 125, and the control memory information is received from the channel controller 710 during call setup.

It is necessary that none of the time slots having the same number should be empty. If data being bound for the same destination time switch module is smaller than the number of the sub-highways ("m" in FIG. 8), the cells being bound for the different destinations may be mixedly arranged in the time slots having the same number. The time slot data "7" and "8" of FIG. 8 is an example of such a case. If the data being bound for the same destination time switch module is larger than the number of the sub-highways, the data exceeding "m" will be carried on adjacent channels. In FIG. 8, the time slot data "1" exceeds "m". Herein, "m" is identical to the number of the sub-highways and it can be regarded as the number of time slots carried on one cell. The reason for handling the data as stated above is to group the DS0 data by destinations. The grouped DS0 data are assembled into the corresponding cells by the CLAD 130 and then transferred to the corresponding destinations.

Figure 9:
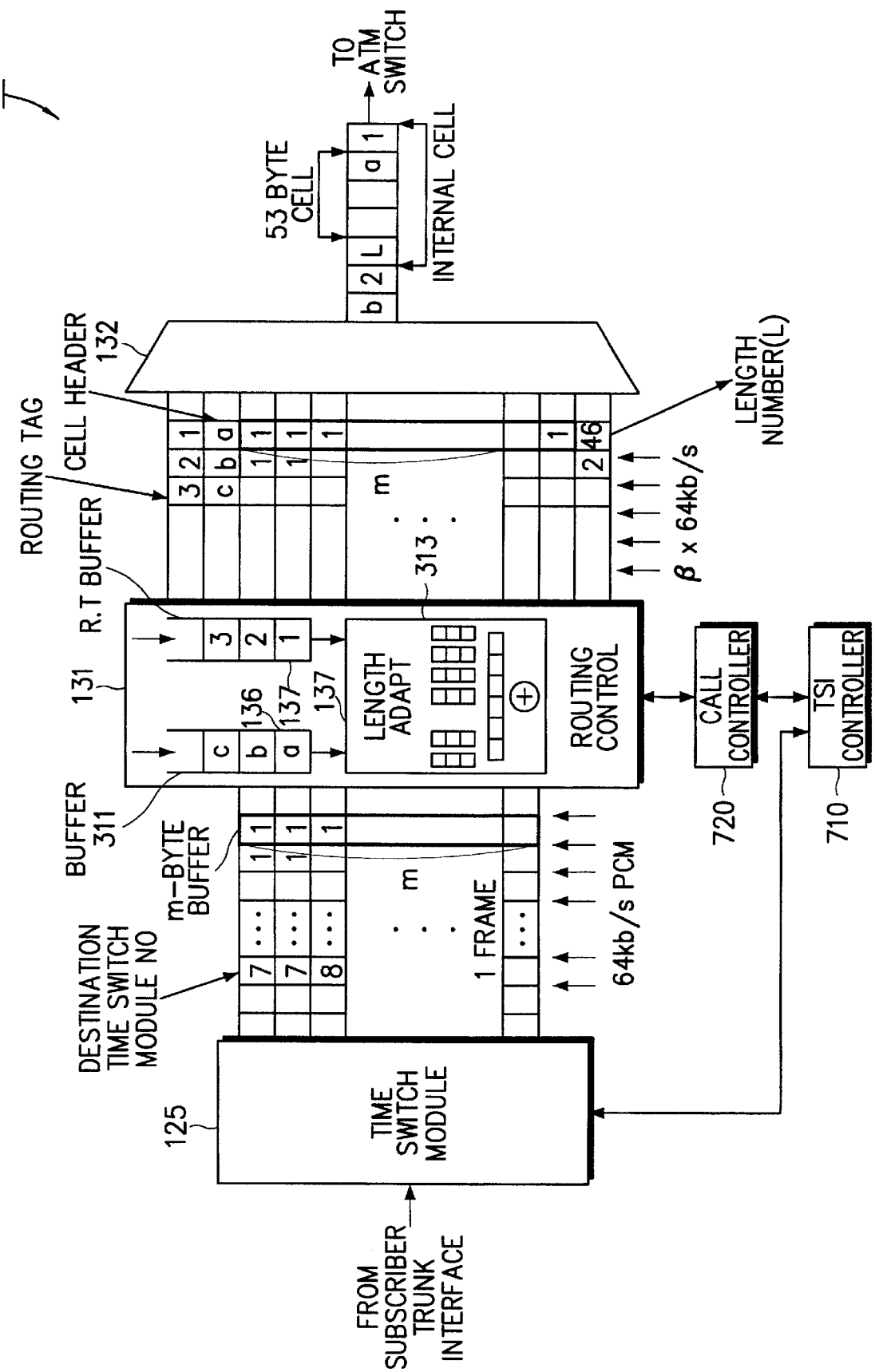
FIG. 9 illustrates the structure of the CLADs of FIG. 4.

The channel data which are grouped by destinations in the time switch module 125 are supplied to the CLAD 130 for assembling and disassembling the cells. FIG. 9 shows the structure of the CLAD 130.

Referring to FIG. 9, the CLAD 130 collects the data being bound for the same destination out of the DS0 channel data input from the time switch module 125 to assemble the collected data into the ATM cell, or disassembles the ATM cell switched by the ATM switch 800 to transfer the disassembled data to the output time switch module.

As illustrated, the CLAD 130 includes a routing controller 131 and a cell multiplexer 132. The routing controller 131 attaches a cell header and a routing tag to a cell payload, and indicates the valid data length of the cell. The cell multiplexer 132 multiplexes the cells output from the routing controller 131. Similarly, the opposing CLAD 330 includes a demultiplexer and a routing controller, to disassemble the ATM cell switched at the ATM switch 800 and transmit the cell to the destination.

In FIG. 9, letters "a", "b", "c", . . . in the routine controller 131 denote cell headers stored in the cell header buffer 136, and letters "1", "2", "3", . . . denote routing tags stored in a routing tag buffer 137. Accordingly, one cell header and one routing tag are allocated for each ATM cell (in pairs of "a" and "1","b" and "2", "c" and "3", . . . ). These values are provided from the call controller 720 during call setup, and stored in the buffers 136 and 137 until the call is released. In FIG. 9, a letter "L" represents, by the byte number, the valid portion of the data carried on the cell payload.

Figure 10:
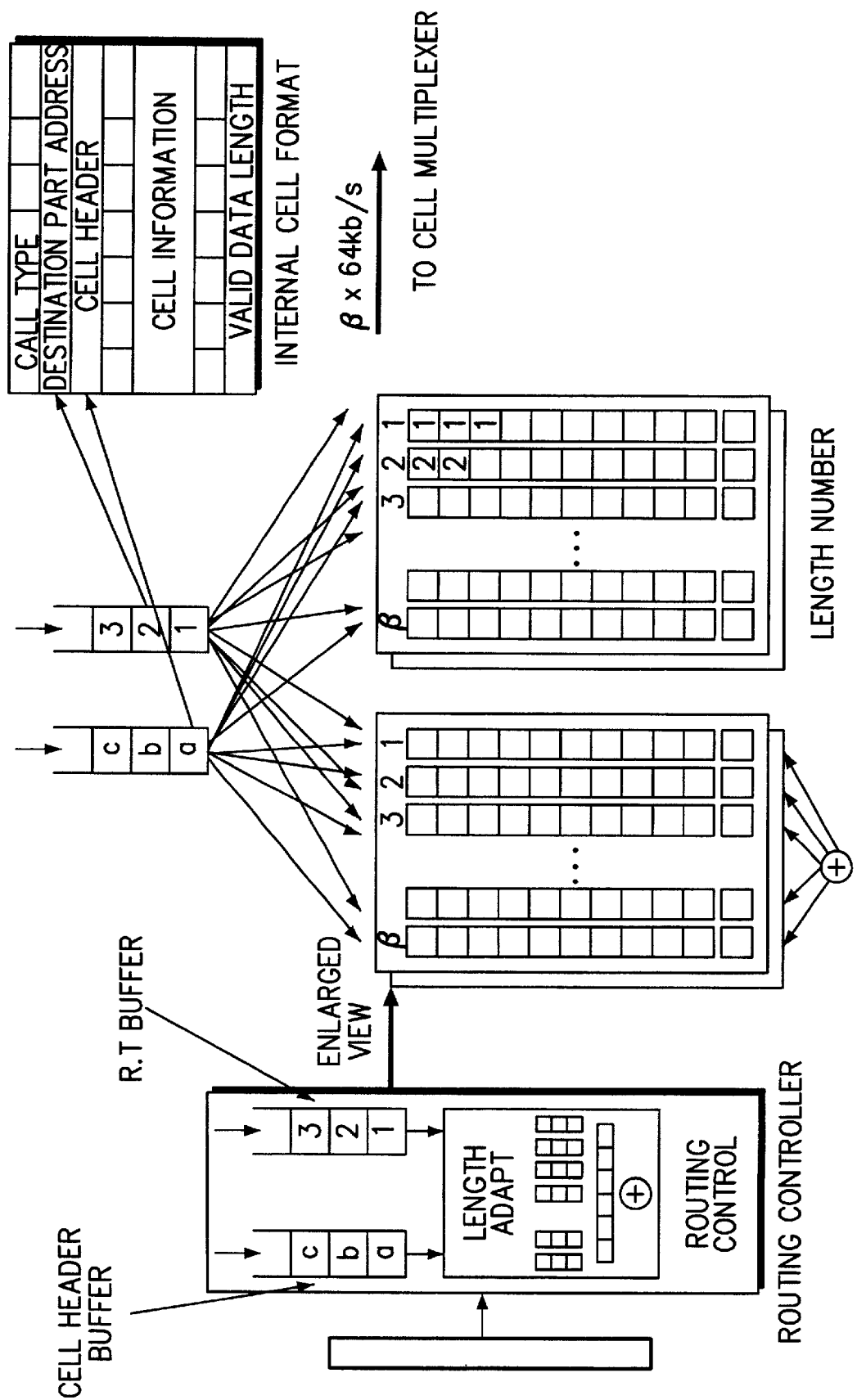
FIG. 10 illustrates the structure of a routing controller (131) of FIG. 9.

Referring to FIG. 10, since the DS0 data has already been grouped by destinations in the time switch module 125, the data being bound for the same destination may collect in the same ATM cell, by mapping the DS0 data positioned at the same time slots into the payload of the ATM cell. However, as described in connection with FIG. 8, in case the data being bound for the several output time switch modules are mixed together, the time switch module 125 groups the mixed data by destinations and the CLAD 130 makes new ATM cells for the respective destinations. For instance, if there are five destinations in the group, four cells are copied increasing in number to five cells, and each cell collects the data having the same destination. Accordingly, the data transfer rate of 64 Kbps increases by N times, which does not affect the switching speed of the ATM switch 800.

The cell header information and the routing tag information are supplied to the routing controller 131 during call setup under the control of the call controller 720, and maintained until the call is released. The cell header information and the routing tag information stored in the respective buffers 136 and 137 as shown in FIG. 10, are added to the corresponding time slots of the sub-highway. The addition of the routing tags increases the operating speed of the ATM switch 800.

When the CLAD 130 assembles the cells, it is necessary to indicate the valid data length to the cell payload. Specifically, the length of the valid data is indicated in the byte number by using the last byte of the cell payload, and removed by the CLAD at the destination. In FIG. 10, an indicator for indicating the valid data length is denoted by a trailer attached ($\oplus$). Herein, $\alpha$ denotes the number of N-ISDN channel modules, and $\beta$ denotes the sum of the number of N-ISDN channel control modules and the number of the other interface modules. The values $\alpha$ and $\beta$ can be set differently according to the construction of the switch. A cell for-mat having the cell header, the routing tag, and the length of the valid data can be constructed as shown in Table 1.

TABLE 1

Call Type
Destination Module Number
Cell Header (5 Bytes)
Cell Payload
Valid Data Length Indicator In Table 1, a data filed for the call type is used for indicating the call types, e.g. a voice-to-voice call, a voice-to-nonvoice call, etc.

Further, the cell multiplexer 132 multiplexes the assembled cells output from the routing controller 131.

Here, one internal cell includes the routing tag, and the cell payload on which the data grouped from the parallel DS0 channels is carried, and a letter "S" in FIG. 4 denotes the internal cells. Therefore, the velocity of the internal ATM cell becomes (cell payload+cell header+routing tag)×8 bits, and should be identical to a port velocity of the ATM switch 800. The port velocity of the ATM switch 800 is variable according, to how the ATM switch is realized.

As one of the factors realizing the ATM switch 800, an input/output condition of the CLAD 130 is designed to confirm with an input/output interface of the ATM switch 800, so that a fabric for any type of the ATM switch 800 may be applicable. The ATM switch 800 may be realized by a common ATM switch. In the specification, a description of the ATM switch 800 has therefore been omitted.

In FIG. 4, the D-channel handler 510 handles the packet data transferred to the D-channel. The D-channel data may be received from the N-ISDN channel module directly or via a routing path including the ATM switch 800.

Figure 11:
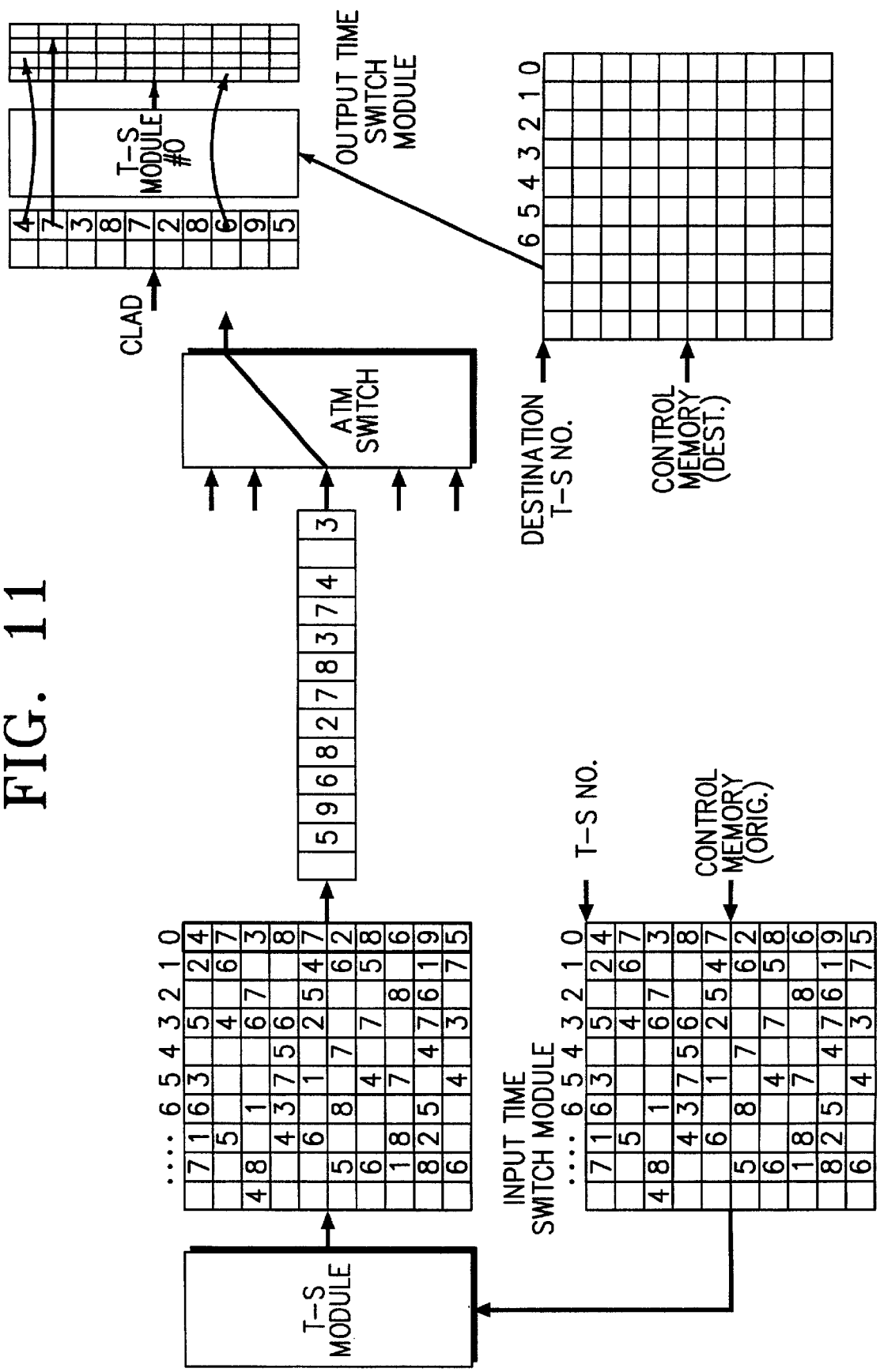
FIG. 11 illustrates a control process for handing N-ISDN traffic in the ATM switch of FIG. 4.

FIG. 11 is a diagram for explaining how the ATM switching system of the invention switches the DS0 channel data. In the specification, description will be made, laying stress on the subscriber input (originating) module 100 and the subscriber output (destination) module 300.

The DS0 channel data input is switched and transferred by way of the input time switch module 125→ the CLAD 130→the ATM switch 800→the output CLAD 330→the output time switch module 325 (not shown), as shown in FIGS. 4 and 11. Then, an output of the output time switch module 325 (not shown, but included in the N-ISDN subscriber channel 320) is transferred to the destination subscriber by the reverse operation of the output N-ISDN subscriber channel controller 300.

The data input to time switch module 125 are sorted such that they are bound for the output (or destination) time switch module 325, and the cell header and the routing tag are added to the sorted data groups to assemble the ATM cell. Thereafter, the ATM cell assembled is transferred to the CLAD and the time switch module via the ATM switch 800. The time switch module of the terminating party performs the time slot interchange to transfer the ATM cell to the final destination N-ISDN subscriber/trunk interface. As can be appreciated from the drawing, the circuit switching function by the time slot interchange is implemented in the existing manner. The two tables at the bottom of the drawing denote the control memory of the time switch module.

The blank table on the lower right hand corner of FIG. 11 normally includes the table slot numbers to be switched and outputted by the time slot interchange.

The ATM switching system of the invention may have 4 types of modules connected to the input port and also 4 types of modules connected to the output port, so that the ATM switching system can service 4 switching functions. To provide the respective services, the ATM switching system should have a software program for handling the N-ISDN and ATM calls, and a software program for number translation and signaling.

Figure 12:
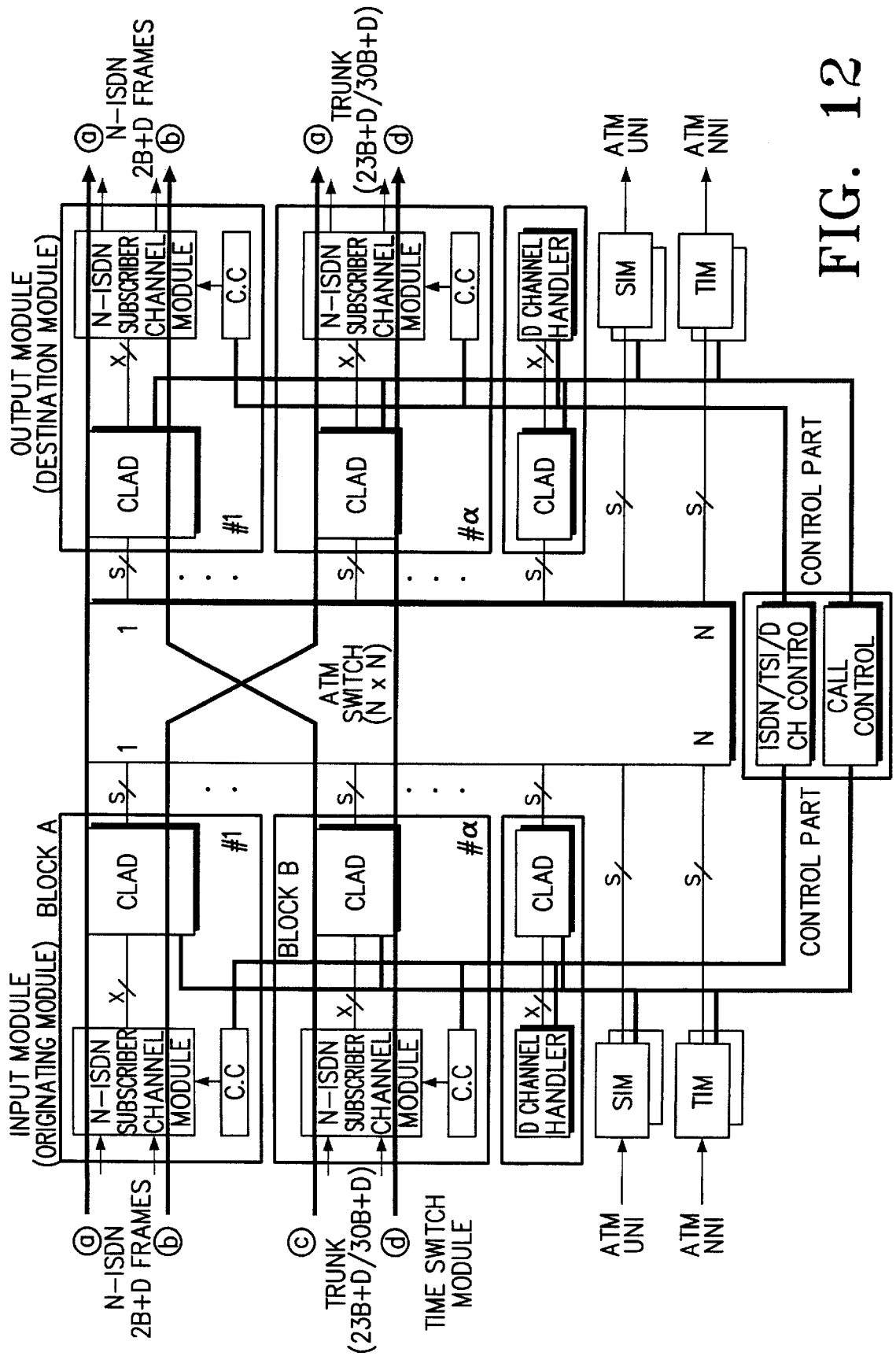
FIG. 12 is a diagram explaining how to service traffic between the N-ISDNs using the ATM switch according to an embodiment of the present invention.

First, a description follows for the case where both the input party (or origination) and the output party (or destination) are the N-ISDN subscriber or the N-ISDN trunk (i.e., a N-ISDN to N-ISDN call). Referring to FIG. 12, (a) denotes a local call path through which a call incoming from the N-ISDN subscriber is switched to another N-ISDN subscriber, and (b) denotes an outgoing call path through which a call incoming from the N-ISDN subscriber is switched to the N-ISDN trunk. Further, (c) denotes an incoming call path through which a call incoming from the N-ISDN trunk is switched to the N-ISDN subscriber, and (d) denotes a transit call path through which a call incoming from the N-ISDN trunk is switched to another N-ISDN trunk. That is, (a) is N-ISDN to N-ISDN local call path, and (b)–(d) are N-ISDN to N-ISDN trunk call paths.

Figure 13:
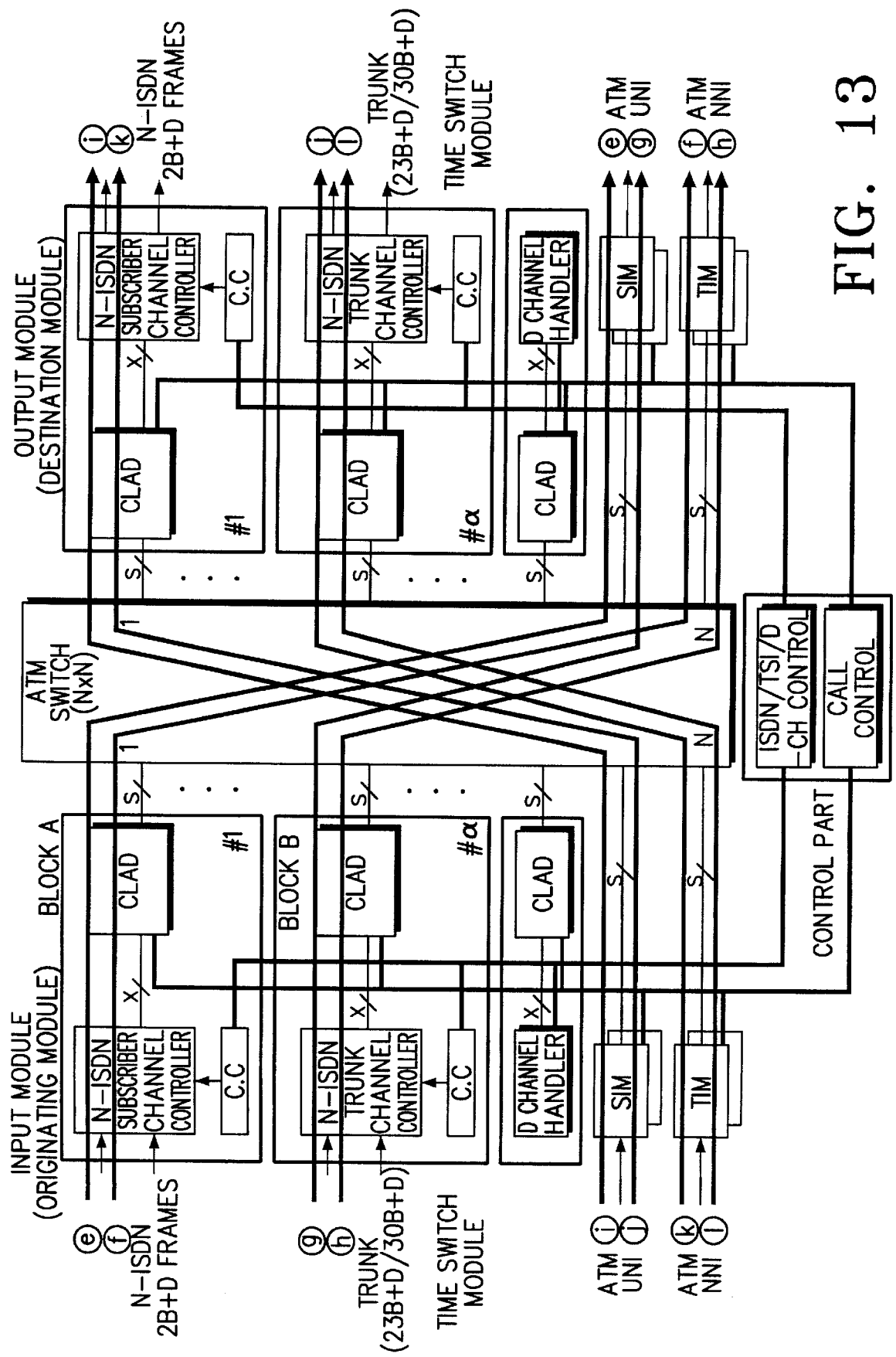
FIG. 13 is a diagram explaining how to service traffic between the N-ISDN and the ATM network using the ATM switch according to an embodiment of the present invention.

Second, a description follows for the case where the input party (or origination) is the N-ISDN subscriber or the N-ISDN trunk and the output party (or destination) is an ATM subscriber or an ATM trunk (i.e., N-ISDN to ATM call). Referring to FIG. 13, (e) denotes a local call path through which a call incoming from the N-ISDN subscriber is switched to the ATM subscriber, (f) denotes an outgoing call path through which a call incoming from the N-ISDN subscriber is switched to the ATM trunk, (g) denotes an incoming call path through which a call incoming from the N-ISDN trunk is switched to the ATM subscriber, and (h) denotes a transit call path through which a call incoming from the N-ISDN trunk is switched to the ATM trunk. Further, (i) denotes a local call path through which a call incoming from the ATM subscriber is switched to the N-ISDN subscriber, (j) denotes an outgoing call path through which a call incoming from the ATM subscriber is switched to the N-ISDN trunk, (k) denotes an incoming call path through which a call incoming from the ATM trunk is switched to the N-ISDN subscriber, and (l) denotes a transit call path through which a call incoming from the ATM trunk is switched to the N-ISDN trunk. That is, (e) is N-ISDN to ATM local call path, (f)–(g) are N-ISDN to ATM trunk call paths, (i) is ATM to N-ISDN local call path, and (j)–(l) are ATM to N-ISDN trunk call paths.

Figure 14:
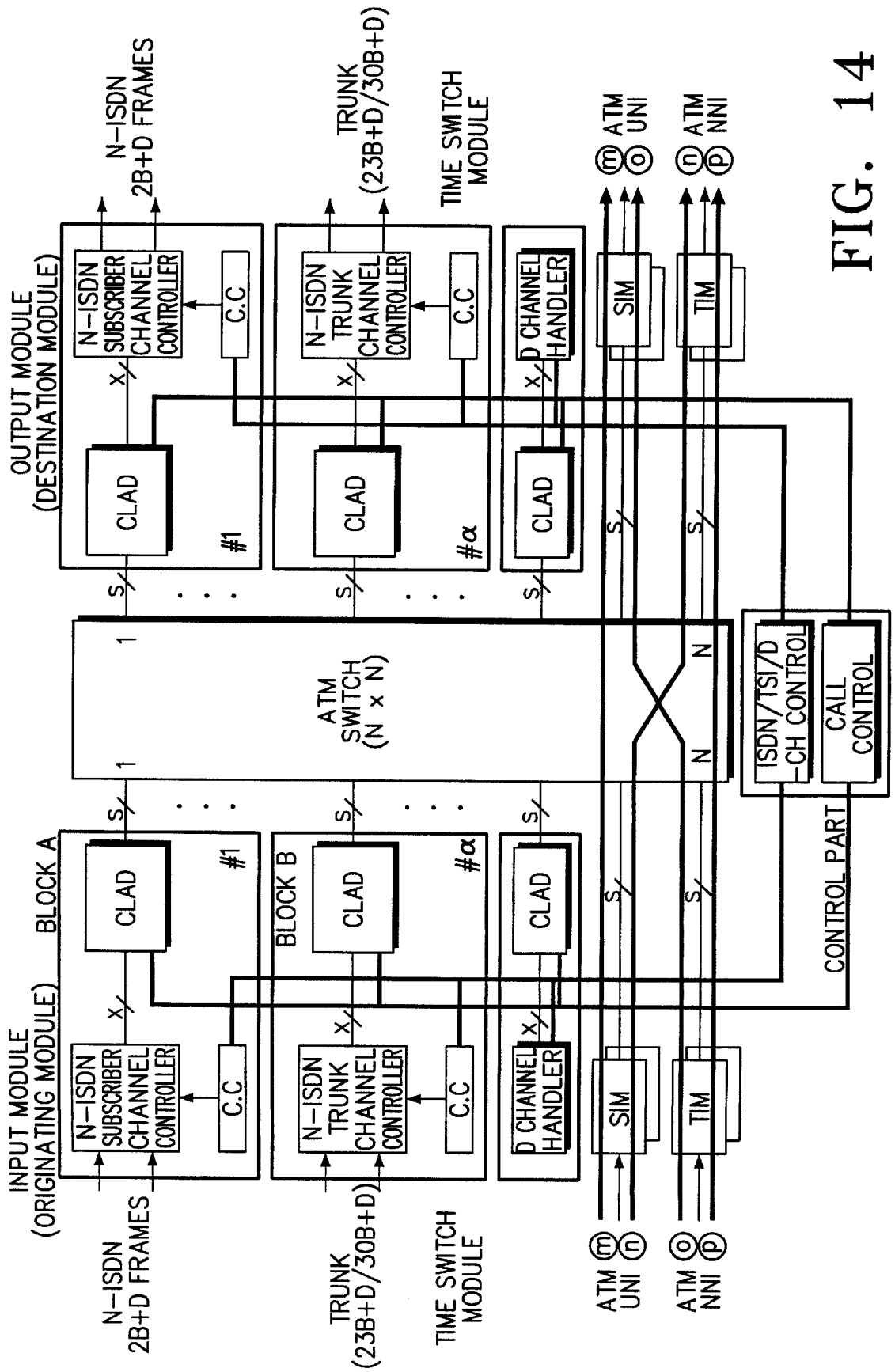
FIG. 14 is a diagram explaining how to service traffic between the ATM networks using the ATM switch according to an embodiment of the present invention.

Third, a description follows for the case where both the input party (or origination) and the output party (or destination) are the ATM subscriber or the ATM trunk (i.e., an ATM-to-ATM call). Referring to FIG. 14, (m) denotes a local call path through which a call incoming from the ATM subscriber is switched to another ATM subscriber, and (n) denotes an outgoing call path through which a call incoming from the ATM subscriber is switched to the ATM trunk. Further, (o) denotes an incoming call path through which a call incoming from the ATM trunk is switched to the ATM subscriber, and (p) denotes a transit call path through which a call incoming from the ATM trunk is switched to another ATM trunk. That is, (m) is an ATM-to-ATM local call path, and (n)–(p) are ATM-to-ATM trunk call paths.

As described above, the ATM switching system according to the present invention has the following advantages.

(1) The ATM switching system can prevent delays in assembling the ATM cells.

(2) The ATM switching system does not require an echo canceller, since an echo is not generated due to the prevention of the cell delay.

(3) Lowering of the cell bandwidth efficiency can be minimized.

(4) The existing time slot interchange circuit (or chip) and control method thereof can be used, as is, thereby reducing the cost of the system.

(5) The ATM switching system can provide both STM and ATM services using a single switch, without separate STM and ATM switches.

(6) Employing the distributed interworking technique, the ATM switching system has a simple CLAD interworking between the STM and the ATM.

(7) Since the N-ISDN channel control module splits the D-channel sub-highway from the B-channel sub-highway to handle them, the D-channel sub-highway can be connected to the D-channel handler (e.g., the packet handler) directly or through the switch fabric.

While the present invention has been described in detail with reference to the specific embodiments, they are mere exemplary applications. Thus, it is to be clearly understood that many variations can be made by anyone skilled in the art within the scope and spirit of the present invention.

What is claimed is:

1. An ATM (Asynchronous Transfer Mode) switching system, comprising:
    a subscriber input module comprising:
        a 2B+D frame handler for splitting 2B+D channel data output from an N-ISDN (Narrowband-Integrated Services Digital Network) subscriber into B-channel data and D-channel data, and multiplexing the split B- and D-channel data to corresponding highways;
        a first time switch module for sorting the channel data on the respective highways by time slots corresponding to destination time switch module numbers, and switching channel stream data grouped by destinations to the respective highways;
        a first input CLAD (Cell Assembly and Disassembly) for collecting voice data output from the time switch module by destinations to assemble an ATM cell;
    a trunk input module comprising:
        a frame handler for splitting frame data output from an N-ISDN trunk into B-channel data and D-channel data, and multiplexing the split B- and D-channel data to respective highways;
        a second time switch module for sorting the channel data on the respective highways by time slots corresponding to destination time switch module numbers, and switching channel stream data grouped by destinations to the respective highways;
        a second input CLAD for collecting voice data output from the second time switch module by destinations to assemble an ATM cell;
    an ATM switch having input ports connected to the subscriber input module and the trunk input module, and having output ports connected to a subscriber output module and a trunk output module, for self-routing the ATM cell input from the subscriber input module and the trunk input module to switch the ATM cell to a corresponding destination;
    said subscriber output module handling, in reverse order, the ATM cell output from the ATM switch and outputting the ATM cell handled to another N-ISDN subscriber, said subscriber output module having a same construction as that of the subscriber input module; and
    said trunk output module handling, in reverse order, the ATM cell output from the ATM switch and outputting the ATM cell handled to another N-ISDN trunk, said trunk output module having a same construction as that of the trunk input module.

2. The ATM switching system as claimed in claim 1, each of the CLADs in the subscriber/trunk input modules comprising a first routing controller for mapping time slot data on respective sub-highways into a payload portion of the ATM cell, attaching a cell header and a routing tag to the payload portion, and indicating valid data length of the ATM cell; and a cell multiplexer for multiplexing the ATM cell assembled by the routing controller and outputting the multiplexed ATM cell to the ATM switch; and each of the CLADs in the subscriber/trunk output modules comprising: a cell demultiplexer for demultiplexing the ATM cell output from the ATM cell switch; and a second routing controller for removing the cell header and the routing tag from the demultiplexed ATM cell, disassembling cell payload data into stream data having a destination time switch module number, and outputting the stream data to the respective highways.

3. The ATM switching system as claimed in claim 1, said time switch modules switching the time slots to be sorted in ascending order on a basis of a time slot corresponding to the destination time switch module number for the B- and D-channel data input from the respective highways.

4. A multimedia switching system, comprising:
    a subscriber input module comprising:
        a 2B+D frame handler for splitting 2B+D channel data output from an N-ISDN subscriber into B-channel data and D-channel data, and multiplexing the split B- and D-channel data to corresponding highways;
        a first time switch module for sorting the channel data on the respective highways by time slots corresponding to destination time switch module numbers, and switching channel stream data grouped by destinations to the respective highways;
        a first input CLAD for collecting voice data output from the time switch module by destinations to assemble an ATM cell;
    a trunk input module comprising:
        a frame handler for splitting frame data output from an N-ISDN trunk into B-channel data and D-channel data, and multiplexing the split B- and D-channel data to respective highways;
        a second time switch module for sorting the channel data on the respective highways by time slots corresponding to destination time switch module numbers, and switching channel stream data grouped by destinations to the respective highways;
        a second input CLAD for collecting voice data output from the second time switch module by destinations to assemble an ATM cell;
    an input ATM subscriber interface module for interfacing the ATM cell output from an ATM subscriber;
    an input ATM trunk interface module for interfacing the ATM cell output from an ATM trunk;
    an ATM switch having input ports connected to the subscriber input module and the trunk input module, and having output ports connected to a subscriber output module and a trunk output module, for self-routing the ATM cell input from the subscriber input module and the trunk input module to switch the ATM cell to a corresponding destination;
    said subscriber output module handling, in reverse order, the ATM cell output from the ATM switch and outputting the ATM cell handled to another N-ISDN subscriber, said subscriber output module having a same construction as that of the subscriber input module;
    said trunk output module handling, in reverse order, the ATM cell output from the ATM switch and outputting the ATM cell handled to another N-ISDN trunk, said trunk output module having a same construction as that of the trunk input module;
    an output ATM subscriber interface module for outputting the ATM cell input from the ATM switch to the ATM subscriber; and
    an output ATM trunk interface module for outputting the ATM cell input from the ATM switch to the ATM trunk.

5. A method of handling N-ISDN traffic in an ATM switching system, comprising the steps of:

splitting channel data input from an N-ISDN subscriber and an N-ISDN trunk into B-channel data and D-channel data, and multiplexing the split B- and D-channel data to respective highways;

sorting the channel data on the respective highways by time slots corresponding to destination time switch module number, and switching channel stream data grouped by destinations to the respective highways;

collecting the stream data by destinations and assembling the stream data collected into an ATM cell;

self-routing the ATM cell and switching the self-routed ATM cell to a corresponding destination;

disassembling the switched ATM cell by destination, to convert the ATM cell to the channel stream data; and switching the time slots according to destinations for the disassembled channel stream data, to output the channel stream data to interfaces at corresponding destinations.

6. The method as claimed in claim 5, said step of assembling the ATM cell comprising the steps of:

mapping time slot data on respective sub-highways into a payload portion of the ATM cell, attaching a cell header and a routing tag to the cell payload, and indicating a valid data length; and multiplexing the ATM cell.

7. The method as claimed in claim 6, said step for disassembling the ATM cell comprising the steps of:

demultiplexing the switched ATM cell; and removing the cell header and the routing tag from the demultiplexed ATM cell, disassembling cell payload data into the stream data having the destination time switch module number, and outputting the stream data to the respective highways.

8. The method of claim 5, wherein said N-ISDN traffic comprises data in the form of 2B+D, 23B+D and 30B+D and said ATM switching system comprises a single ATM switch.

9. The method of claim 7, further comprising the step of combining B-channel data with D-channel data.

10. The method of claim 5, wherein said self-routing the ATM cell comprises said routing is performed by a single ATM switch.

* * * * *